United States Patent
Kado et al.

(10) Patent No.: US 8,975,796 B2
(45) Date of Patent: Mar. 10, 2015

(54) ELECTRIC MOTOR AND ELECTRIC EQUIPMENT WITH SAME

(75) Inventors: Haruhiko Kado, Osaka (JP); Hirofumi Mizukami, Osaka (JP); Akihiko Watanabe, Osaka (JP); Takehiko Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 767 days.

(21) Appl. No.: 13/262,775

(22) PCT Filed: Mar. 29, 2010

(86) PCT No.: PCT/JP2010/002250
§ 371 (c)(1),
(2), (4) Date: Oct. 3, 2011

(87) PCT Pub. No.: WO2010/125740
PCT Pub. Date: Nov. 4, 2010

(65) Prior Publication Data
US 2012/0032536 A1   Feb. 9, 2012

(30) Foreign Application Priority Data

Apr. 28, 2009  (JP) .................. 2009-109193

(51) Int. Cl.
*H02K 5/16* (2006.01)
*H02K 5/173* (2006.01)
*H02K 5/08* (2006.01)
*H02K 11/00* (2006.01)

(52) U.S. Cl.
CPC ............... *H02K 5/1732* (2013.01); *H02K 5/08* (2013.01); *H02K 11/0005* (2013.01); *H02K 11/0089* (2013.01)
USPC .............................. 310/90; 310/43

(58) Field of Classification Search
CPC ....................................... F16C 33/04
USPC ................................. 310/90, 43, 72
See application file for complete search history.

(56) References Cited

U.S. PATENT DOCUMENTS

| | | | |
|---|---|---|---|
| 5,485,331 A | 1/1996 | Dunfield et al. | |
| 2001/0017495 A1 | 8/2001 | Sato et al. | |
| 2003/0086630 A1 | 5/2003 | Bramel et al. | |
| 2006/0049043 A1* | 3/2006 | Matuska et al. | 204/298.21 |
| 2006/0186746 A1 | 8/2006 | Nanbu et al. | |

FOREIGN PATENT DOCUMENTS

| | | |
|---|---|---|
| JP | 10-322965 A | 12/1998 |
| JP | 2002-327751 A | 11/2002 |
| JP | 2007-016846 A | 1/2007 |
| JP | 2007-159302 A | 6/2007 |
| JP | 2008-526175 A | 7/2008 |
| JP | 2008-289272 A | 11/2008 |
| WO | WO 2006/090489 A1 | 8/2006 |

OTHER PUBLICATIONS

International Search Report for International Application No. PCT/JP2010/002250, dated Jun. 1, 2010, 1 page.
Klaassen, Klaas B. et al., "Charge Generation and Bleed-Off in Spindle Motors With Ceramic Ball Bearings," IEEE Transactions on Magnetics, vol. 39, No. 5, Sep. 2003, pp. 2435-2437.
Extended European Search Report for European Application No. 10769442.4, dated Aug. 1, 2012, 10 pages.

* cited by examiner

*Primary Examiner* — Thanh Lam
(74) *Attorney, Agent, or Firm* — Brinks Gilson & Lione

(57) ABSTRACT

A motor includes a stator integrally molded together with a stator member, which includes a stator iron-core wound with a winding, by insulating resin, a rotor mounted on a shaft as a center and confronting the stator, two bearings supporting the shaft rotatably, brackets fixing the bearings, and a drive circuit board including a drive circuit which supplies an electric current to the winding and drives the rotor. Either one of the two bearings includes an outer ring and an inner ring both of which are electrically insulated from each other.

9 Claims, 3 Drawing Sheets

ELECTRIC MOTOR AND ELECTRIC EQUIPMENT WITH SAME

TECHNICAL FIELD

The present invention relates to an electric motor and an electric apparatus including the same motor. More particularly, it relates to an electric motor which is improved against deterioration caused by electric erosion of the bearings, and the electric apparatus including the same motor.

BACKGROUND ART

In recent years, motors driven by the inverter of PWM (Pulse Width Modulation) method have been widely used in the market. In the case of the motors driven by the PWM inverters, an electric potential at the neutral point of the winding cannot be 0 (zero), so that an electric potential difference (hereinafter referred to as an axial voltage) is generated between the outer ring and the inner ring of the bearing. The axial voltage contains a high-frequency signal produced by the switching operation. When the axial voltage reaches a dielectric breakdown voltage of the oil film inside the bearing, a micro electric current (hereinafter referred to as an axial current) runs in the bearing, thereby causing electric erosion in the bearing. Development of electric erosion will result in wavy abrasions on the inner ring, the outer ring, or the balls of the bearing and the wavy abrasions sometimes cause abnormal sound. The electric erosion is thus one of chief factors causing defects of the motor.

The following measures have been taken for preventing the electric erosion:

(1) The inner ring and the outer ring of the bearing are made conductive to each other.

(2) The axial voltage is lowered.

(3) The inner ring is insulated from the outer ring of the bearing.

Measure (1) employs, e.g., a conductive lubricant for the bearing. However, the conductive lubricant loses the conductivity over time, and has an issue of insufficient lubrication. A brush can be mounted on the rotary shaft for making the inner ring and the outer ring conductive to each other; however, this measure cannot be implemented without abrasion dust of the brush and requires a space for installing the brush.

Measure (2), e.g., electrically shorts the stator iron-core to a conductive metallic bracket, thereby varying the electrostatic capacity and lowering the axial voltage. This measure is well known and disclosed in, e.g., Patent Literature 1.

Patent Literature 1 discloses that the stator iron-core is electrically shorted to the bracket for lowering impedance on the stator side, thereby suppressing the electric erosion on the bearing.

To be more specific, the motors used in devices operated in a wet area, e.g. washing machine and dish washer, generally have a risk of causing an electric shock, so that not only is an insulation needed on a charging section (primary insulation), but also an additional insulation independently from the primary insulation (hereinafter referred to as an additional insulation) is needed. On the other hand, motors used in other appliances, e.g., an indoor unit or an outdoor unit of an air-conditioner, a water heater, or an air-cleaner, have no risk of causing an electric shock, so that the additional insulation is not needed. Therefore, the motors used in the indoor unit or outdoor unit of the air-conditioner, the water heater, or the air-cleaner thus employ rotors made not insulated, so that the impedance on the rotor side (the inner ring side of the bearing) stays low, while the impedance on the stator side (the outer ring side of the bearing) stays high. Accordingly, the electric potential on the inner ring side is high while that on the outer ring side is low, so that the potentials are unequal, and a high axial voltage is generated. This high axial voltage may cause electric erosion on the bearing.

In order to avoid the foregoing problem, Patent Literature 1 proposes a method of lowering the impedance on the stator side (the outer ring side) by electrically shorting the stator iron-core to the bracket and thereby eliminating the electrostatic capacity component between the stator iron-core and the bracket. As a result, the impedance on the stator side becomes close to the impedance on the rotor side (the inner ring side), and the difference in electric potential between the inner ring and the outer ring of the bearing, i.e. the axial voltage, is lowered.

However, the method disclosed by Patent Literature 1 lowers the impedance, so that the voltage drop becomes smaller, and the voltage on the outer ring side as well as the voltage of the inner ring side increase. If the impedance balance is lost due to operating environments of the motor and inaccuracies in assembling the stator and the rotor, the axial voltage tends to rise and cause electric corrosion contrary to the expectation.

Measure (3) conventionally employs replacing all the iron-balls in the bearing with non-conductive balls made of electrically insulating material, such as ceramic. See Patent Literature 2. However, this measure is expensive to implement, although a high anti-erosion effect can be expected.

In recent years, as Patent Literature 1 discloses, a molded motor has been proposed in which a fixing member provided on the stator side, such as the stator iron-core, is integrally molded by a mold member to improve the reliability. Further, the molded motor may be of a simpler structure achieved by using a resin housing, which is a part of the mold member, to fix the bearing. On the other hand, given the structural strength necessary to fix the bearing, a metal bracket provides a structurally stronger support for the bearing than the member. For this reason, in these days, the bearings are fixed selectively with a metal bracket or a mold member accordingly to the structural strength required to motors. To be more specific, molded motors have been proposed in which the bearing on the counter output shaft side, where a high fixing strength is not required, is fixed with a part of the mold member of the integral molding, and the bearing on the output shaft side, where a high fixing strength is required, is fixed with a metal bracket.

However, the motor normally uses two bearings to support the shaft, and the electric corrosion problem will arise for the following reasons it as discussed above, one bearing is fixed with a metal bracket and the other bearing is fixed with a resin housing. The resin housing is highly insulative while the metal bracket is conductive. Therefore, limited axial current flows between the inner ring and the outer ring of the hearing fixed with the resin housing, while the axial current relatively freely flows between the inner and outer rings of the bearing fixed with the conductive metal bracket which lowers the insulability. As a result, electric erosion tends to occur on the bearing fixed with the bracket. In other words, the problem arises that electric corrosion occurs mainly on one of the bearing when the two bearings are fixed with fixing members of different materials. Further, even if the two bearings are fixed with metal brackets, their insulabilities may not be equal depending on their sizes and places where the brackets are placed, resulting in that electric erosion tends to concentrate on one bearing. In such a case, the service life of the motor becomes as short as the service life of the one bearing.

Patent Literature 1: Unexamined Japanese Patent Application Publication No. 2007-159302

Patent Literature 2: Unexamined Japanese Patent Application Publication No. 2007-16846

SUMMARY OF THE INVENTION

The present invention provides a motor which suppresses deterioration caused by electric erosion on the bearing, and the electric apparatus having the motor.

A motor of the present invention comprises a stator formed of a stator member including a stator iron-core and a winding wound thereon integrally molded by insulating resin, a rotor mounted around a shaft in a manner to face the stator, two bearings supporting the shaft rotatably, brackets fixing the bearings, and a drive circuit board mounted with a drive circuit which supplies an electric current to the winding for driving the rotor. One of the two bearings is electrically insulated between the outer ring and the inner ring.

The motor of the present invention includes two bearings, and each of the bearings has multiple balls between the outer ring and the inner ring. At least one of the outer ring, inner ring and balls of one bearing is made of insulating material.

The foregoing structure restricts the axial current from flowing through the insulated bearing, thereby suppressing the development of deterioration caused by electric erosion. In other words, the one bearing, where electric erosions tend to occur, is insulated as explained above, and the other bearing, where electric erosions are limited, employs iron balls, so that the service lives, shortened by the electric erosion, of the bearings can be made nearly equal to each other. As a result, the service life of the motor can be prolonged.

The motor of the present invention employs the two bearings, and one of which is fixed with a bracket while the other one is fixed with insulating resin.

A motor of the present invention employs the two bearings, and they may be fixed with brackets of different sizes.

With the construction above, even if the insulabilities with respect to the two bearings are not equal, since the one bearing, where electric erosion tends to occur, is insulated, and the other bearing, wherein electric corrosion is limited, employing a regular iron balls, the service lives, shortened by the electric erosions, of the two bearings may be made nearly equal to each other, the deterioration in the motor caused by the electric erosions on the bearings can be suppressed.

An electric apparatus of the present invention includes the motor previously discussed.

The motor of the present invention and the electric apparatus having the motor can make the service lives of the two bearings nearly equal to each other, and the service life of the motor can be prolonged.

DETAILED DESCRIPTION OF THE PREFERRED EMBODIMENTS

Exemplary embodiments of the present invention are demonstrated hereinafter with reference to the accompanying drawings.

Exemplary Embodiment 1

Figure 1:
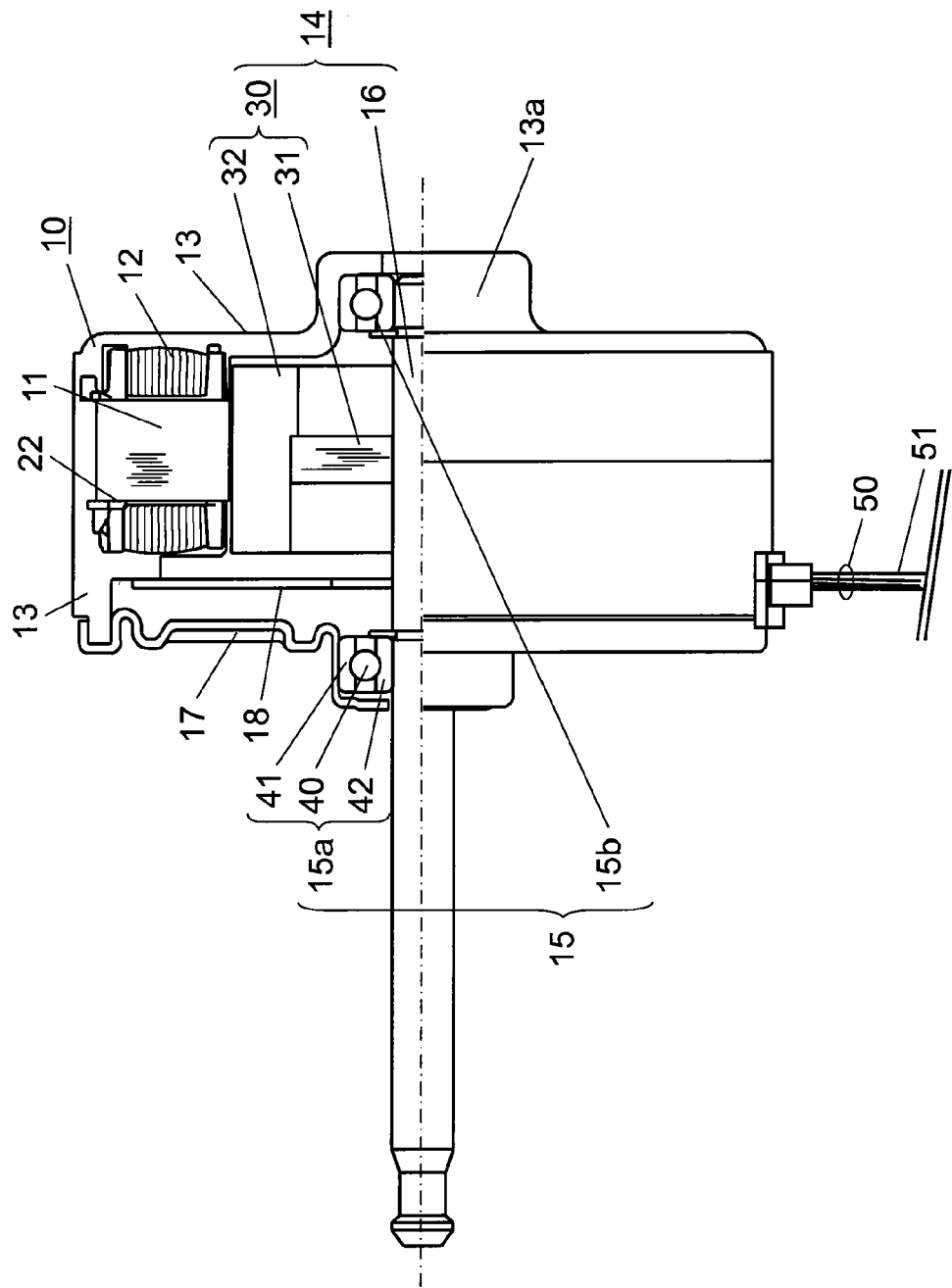
FIG. 1 is a sectional view showing a structure of a motor in accordance with a first embodiment of the present invention.

FIG. 1 is a sectional view showing a structure of a motor in accordance with the first embodiment of the present invention. In this first embodiment, a motor is mounted in an air-conditioner which is an example of electric apparatus, and the motor is a brushless motor that drives the blower fan of the indoor unit. The motor is an inner-rotor type in which the rotor is placed rotatably inside the stator.

In FIG. 1, insulator 22 made of resin insulates stator iron-core 11, and winding 12 is wound on iron-core 11. This iron-core 11 is molded integrally together with other stator members by a molding material, or insulating resin 13. This integral molding makes stator 10 roughly in a cylindrical shape.

Rotor 14 is inserted inside stator 10 with a space between them. Rotor 14 includes rotary body 30 of a disc shape having rotor iron-core 31. Rotary body 30 includes shaft 16 attached to rotary body 30 so as to extend through rotary body 30 at the center. Rotary iron-core 31 circumferentially holds multiple permanent magnets facing the inner wall of stator 10. FIG. 1 shows an example of rotor iron-core 31 integrally molded together with ferrite resin magnets 32 working as the permanent magnets. The inner wall of stator 10 thus faces the outer wall of rotary body 30.

Shaft 16 of rotor 14 is mounted with two bearings which support shaft 16. Bearings 15 are in a cylindrical shape and each include multiple balls between the outer ring and the inner ring. The inner sides of bearings 15 are fixed to shaft 16. As shown in FIG. 1, shaft 16 is supported by bearing 15a on the output shaft side, namely, the side on which shaft 16 protrudes from the brushless motor body, and on the other side, i.e. the counter output shaft side, shaft 16 is supported by bearing 15b. Bearing 15a on the output shaft side is fixed with metal bracket 17 at the outer ring side, and bearing 15b on the counter output shaft side is fixed with insulating resin 13 used in the integral mold at the outer ring side. The foregoing structure allows two bearings 15 to support shaft 16 so that rotor 14 can rotate.

The brushless motor includes drive circuit board 18, on which a drive circuit having a control circuit is mounted. After board 18 is built into the brushless motor, bracket 17 is press-fitted into stator 10, thereby completing the brushless motor.

Drive circuit board 18 is connected with connection wires 50 including e.g. lead-wires for applying the power supply voltage of the windings, the power supply voltage of the control circuit, and the control voltage for controlling the rpm, and also grounding wire 51, which is connected to ground GND on board 18. The ground is a reference point of zero electric potential on board 18. This reference point is used for setting a reference electric potential at 0 (zero) volt, so that a wiring pattern as the ground wiring is prepared on board 18. To be more specific, grounding wire 51 included connection wires 50 is connected to the ground wiring on board 18.

The ground on drive circuit board 18, which is mounted with the drive circuit, is insulated from the earth ground and a primary side (power supply) circuit, and is in a floating state from the electric potential of the earth ground and that of the primary side power supply circuit. The power supply circuit for supplying the power supply voltage to the winding, the power supply circuit for supplying the power supply voltage to the control circuit, the lead wire for applying the control voltage, and grounding wire 51, all of which are connected to board 18, are electrically insulated from the earth ground that is connected to the primary side circuit. In other words, the foregoing power supply circuits and others are electrically insulated from the following items: the primary side (power supply) circuit relative to the power supply circuit for supplying the power supply voltage to the wiring; the primary side (power supply) circuit relative to the power supply circuit for supplying the power supply voltage to the control circuit; the earth ground connected to these primary side (power supply) circuits; and an independent earth ground. To be more specific, the drive circuit mounted on board 18 is electrically insulated from the electric potential of the primary side circuits and that of the earth ground, so that the electric potential of the drive circuit is in a floating state. This is described by a well-known expression that the electric potential is floated. The structure of the power supply circuit for the windings connected to board 18 and that for the control circuit is expressed as a floating power supply, and this expression is also well known.

In first bearing 15a of the two bearings, the brushless motor in accordance with this first embodiment employs balls 40 made of ceramic material, an electrically insulating material in order to electrically insulate outer ring 41 from inner ring 42 of bearing 15a. On the other hand, second bearing 15b employs regular iron balls and the inner ring and outer ring both made of iron. The brushless motor thus includes first bearing 15a, in which outer ring 41 is electrically insulated from inner ring 42, and which is fixed to metal bracket 17, and second bearing 15b is fixed to insulating resin 13.

By supplying the power supply voltages and the control signals through connection wires 50 to the brushless motor as structured above, the drive circuit mounted on drive circuit board 18 flows a drive current through stator windings 12, and iron-core 11 generates magnetic fields. Interaction between the magnetic field from iron core 11 and the magnetic field from permanent magnets 32 produces attractive force and repulsive force in response to the polarities of the magnetic fields, and those forces rotate rotor 14 on shaft 16.

The structure of the foregoing brushless motor is discussed in more detail. The brushless motor of the embodiment has the above-discussed structure, in which shaft 16 of the motor is supported by two bearings 15, and bearing 15a is fixed with metal bracket 17, and bearing 15b is fixed with insulating resin 13.

To be more specific, bearing 15b on the counter output shaft side is fixed by a hollow cylindrical section of insulating resin 13 which a diameter nearly equal to the outer diameter of bearing 15b. As shown in FIG. 1, insulating resin 13 on the counter output shaft side is as shaped as motor projection part 13a projecting from the motor body in the counter output shaft direction. The inside of motor projection part 13a forms a hollow cylindrical shape, the diameter of which is nearly equal to the outer diameter of bearing 15b, which is inserted in the hollow cylindrical shape and fixed to insulating resin 13. Bearing 15b is thus placed inside motor projection part 13a.

Next, bearing 15a on the output shaft side is fixed by bracket 17 whose outer diameter is nearly equal to that of stator 10. Bracket 17 is in a disk shape and has a projection section at the center of the disc. The projection section is hollow inside and has an outer diameter nearly equal to that of bearing 15a. The brushless motor is formed such that after drive circuit board 18 is built in the motor, the projection section is press-fitted onto bearing 15a so as to be in the inside of the projection section of bracket 17, and bracket 17 is also press-fitted onto stator 10 such that a connection terminal provided to the outer wall of bracket 17 is connected to the connection terminal of stator 10. This structure will ease the assembling work, and bearing 15a can be firmly fixed.

When the brushless motor is viewed from the electrical view of point, the main source of the axial voltage may be considered stator iron-core 11 on which stator winding 12 is wound, which is driven by high-frequency switching of the PWM method. As discussed previously, the impedance on the rotor side (the inner ring side) is low while the impedance on the stator side (the outer ring side) is high. In other words, the path of the rotor side impedance between iron-core 11 and the inner ring of bearing 15 includes a narrow clearance with which stator iron-core 11 faces rotary body 30. Since rotary body 30 and shaft 16 are made of conductive material, the impedance across the path between iron-core 11 and the inner ring of bearing 15 is low. Further, since the impedance across the path is low, the high-frequency signal generated from stator iron-core 11 can travel to the inner ring with little attenuation. As a result, a high voltage with a high frequency is applied to the inner rings of bearings 15.

On the other hand, when the path of impedance between stator iron-core 11 and the outer ring of bearing 15 is viewed, projection part 13a of insulating resin 13, for example, is connected to the outer ring of bearing 15b and is placed at some distance from stator iron-core 11 without any conductive material between them. Therefore, the impedance between stator iron-core 11 and the outer ring of bearing 15 is high. Since metal bracket 17 connected to outer ring 14 of bearing 15a is conductive, the impedance on the bearing 15a side is lower than that on the bearing 15b side. The impedance between bearing 15a and bearing 15b is higher than the impedance on the rotary side. Accordingly, the high-frequency electric current generated from stator iron-core 11 travels to the outer ring of bearing 15 while attenuating. As a result, a lower voltage with high frequency is applied on the outer ring than the voltage on the rotor side.

To be more specific, when the stator side and the rotor side are compared, their impedances are not equal, so that an electrical potential difference, i.e., an axial voltage, arises between the inner ring and the outer ring of bearings 15, and an axial current flows through bearings 15. The flow of axial current accelerates abrasion between the inner ring and the outer ring, so that deterioration due to abrasion, i.e., electric erosion, develops.

When bearing 15a fixed with metal bracket 17 bearing 15b fixed with insulating resin 13 are compared, if both bearings 15a and 15b employ iron balls, a greater amount of axial current flows through bearing 15a than through bearing 15b because bearing 15a has lower impedance than bearing 15b, Since the outer ring sides have different structures, as discussed above, the impedance of bearing 15a on the output shaft side and the impedance of bearing 15b on the counter output shaft side are not equal, so that different amounts of axial currents flow through two bearings 15. Limited axial current flows between the inner ring and the outer ring of bearing 15b fixed with insulating resin 13, while the axial current relatively freely flows through bearing 15a fixed with conductive bracket 17.

To cope with this, the brushless motor in accordance with the embodiment employs ceramic balls 40 in bearing 15a, namely, the bearing through which a greater amount of axial current would flow than through bearing 15b, thereby increasing the electric insulability between outer ring 41 and inner ring 42 of bearing 15a. This structure suppresses the axial current flowing between the inner ring and the outer ring of bearing 15a and thus suppresses development of the electric erosion caused by the axial current. On the other hand, since limited axial current can flow between the inner ring and the outer ring of bearing 15b, the electric erosion is suppressed even when bearing 15b employs widely used iron balls. Considering the span of the service life of the motor which ends due to electric erosion, the service life of bearing 15a and that the service life of bearing 15b become close to each other. As a result, the service life of this brushless motor thus can be prolonged. Further, ceramic balls can be used in only one bearing of the two bearings, so that the cost can be reduced compared to the motor in which ceramic balls are employed in both of the bearings.

The motor of the present invention, as discussed above, comprises a stator formed of a stator member, including a stator iron-core on which a winding is wound, integrally molded by insulating resin, a rotor mounted on a shaft as the center and facing the stator, two bearings supporting the shaft rotatably, brackets fixing the bearings, and a drive circuit board mounted with a drive circuit which supplies an electric current to the winding for driving the rotor. One of the two bearings is electrically insulated between the outer ring and the inner ring. With this structure, the bearing made insulative by using, e.g., ceramic material, hardly flows the axial current through itself, thereby suppressing development of deterioration caused by the electric erosion, and extending the service life of the insulated bearing nearly to the service life of the other bearing employing widely used iron balls. As a result, the service life of the motor can be prolonged. The present invention thus can provide the motor that can suppress deterioration of the bearings caused by the electric erosion.

In the foregoing discussion, since a greater amount of axial current flows through bearing 15a on the output shaft side than through bearing 15b on the counter output shaft side, the embodiment was explained in which ceramic balls 40 are employed in bearing 15a. However, the impedance of bearing 15a on the output shaft side becomes different from that of bearing 15b on the counter output shaft side, depending on structural conditions, such as the size and the shape of bracket 17 fixing bearing 15a, a difference between the distance from stator iron-core 11 to bearing 15a and the distance from iron-core 11 to bearing 15b, and the state of insulating resin 13 therebetween. In other words, contrary to what is discussed previously, there may be a case where a smaller amount of the axial current flows the same bearing fixed with metal bracket. In such a case, ceramic balls may be used in the other bearing, which is not fixed with the metal bracket.

In the previous discussion, only bearing 15a of the two bearings 15 is fixed with metal bracket 17. However, each of the two brackets 15 may be fixed, using a metal bracket.

Figure 2:
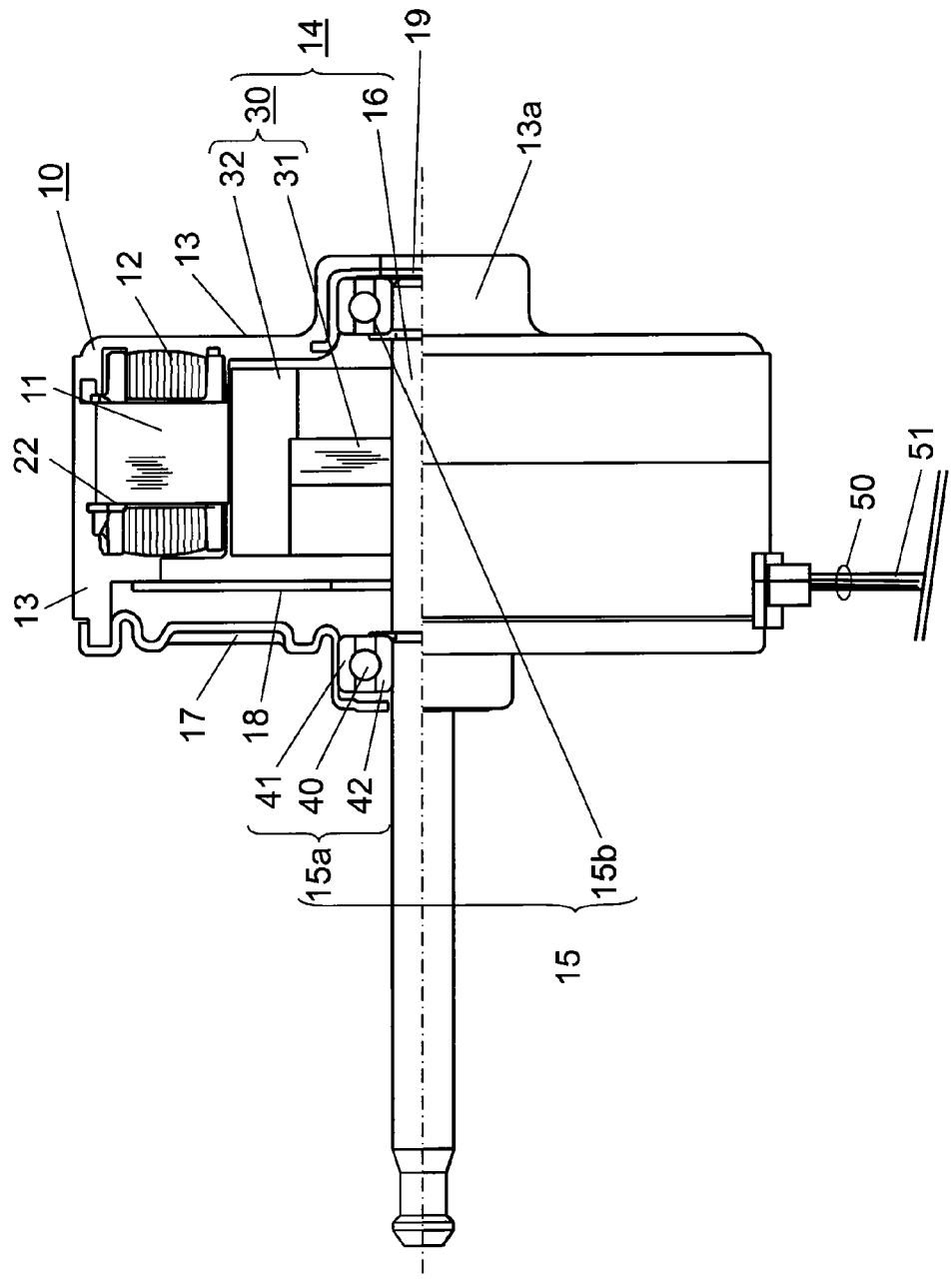
FIG. 2 is a sectional view showing another structure of a motor in accordance with the first embodiment of the present invention.

FIG. 2 is a sectional view illustrating another structure of the motor in accordance with the first embodiment. In FIG. 2, each of the two brackets 15 is fixed with a metal bracket. To be more specific, as shown in FIG. 2, bearing 15b on the counter output shaft side is fixed to insulating resin 13 via bracket 19 whose diameter is smaller than that of bracket 17. Even in this structure, in which each of the two bearings is fixed with a metal bracket, the impedance bearing 15a on the output shaft side and the impedance of bearing 15b on the counter output shaft side may become different and thus the axial currents following through them may become different, depending on the sizes of the two brackets and the structure of the motor. Even in this structure, ceramic material may be employed to make the balls of the bearing through which a greater amount of axial current flows.

The foregoing description was made with the balls of bearing 15 being made of ceramic material. However, one of the outer ring or the inner ring, or all of the outer ring, the inner ring and the balls, may be made of an insulating material such as ceramic material, whereby the same advantageous effect can be obtained.

The previous discussion was made with an inner rotor type motor in which the rotor is rotatably placed inside the stator. However, even in an outer rotor type motor in which the rotor is placed outside the stator and a twin rotor type motor in which the rotors are placed both inside and outside the stator, the same advantageous effect can be obtained by electrically insulating the inner and outer ring of the bearing through which more axial current flows.

Exemplary Embodiment 2

Figure 3:
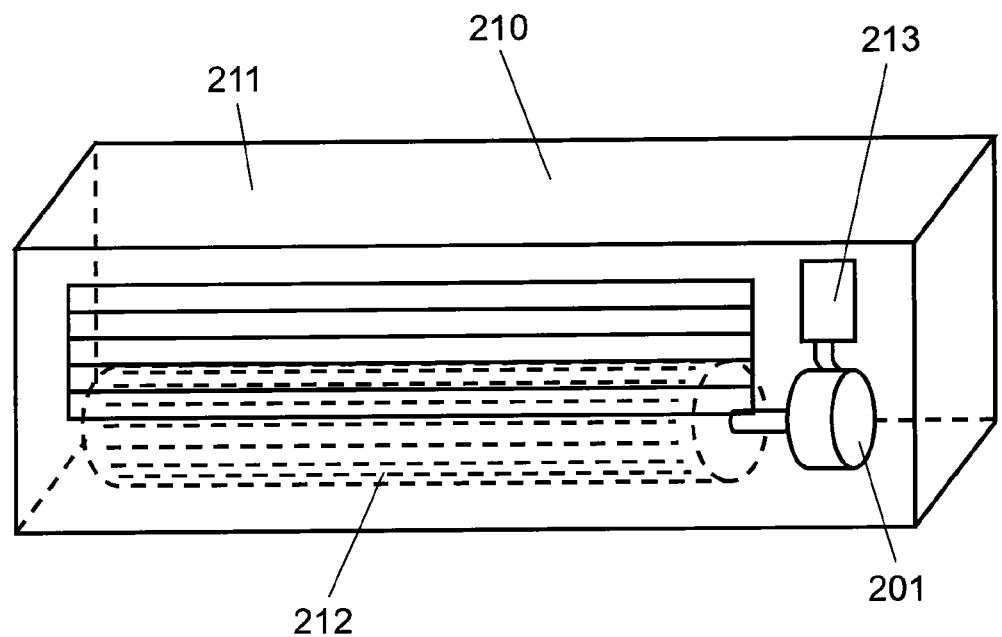
FIG. 3 schematically shows a structure of an indoor unit of an air-conditioner, which is an example electric apparatus in accordance with a second embodiment of the present invention.

The second embodiment is described with the structure of an indoor unit of an air-conditioner as an example of electric apparatus of the present invention. FIG. 3 schematically illustrates the structure of the indoor unit of an air-conditioner as an example of electric apparatus in accordance with the second embodiment of the present invention.

As shown in FIG. 3, indoor unit 210 is formed of housing 211 and brushless motor 201 placed in housing 211. Cross-flow fan 212 is mounted on a rotary shaft of motor 201. Motor 201 is driven by motor driver 213, which is powered to rotate motor 201, and then cross-flow fan 212 starts rotating. The rotation of cross-flow fan 212 blows the air into a room, where the air is conditioned by a heat exchanger (not shown) working for the indoor unit. Brushless motor 201 may be the motor in accordance with the first exemplary embodiment of the present invention.

An electric apparatus of the present invention comprises a brushless motor and a housing in which the motor is mounted. The motor of the present invention having the structure previously discussed may be employed as the brushless motor of the electric apparatus.

The foregoing description was made with the brushless motor used in an indoor unit of the air-conditioner. The present invention can be applied to other brushless motors used in home appliances, information devices, and industrial devices.

INDUSTRIAL APPLICABILITY

Since the present invention suppresses deterioration of motors caused by electric erosion, the present invention can be embodied in motors used in electric apparatuses required to be less expensive and have a longer service life, such as an indoor unit, an outdoor unit of the air conditioner, a water heater, and an air cleaner.

The invention claimed is:

1. A motor comprising:
a stator including a stator iron-core and a winding wound thereon integrally molded together by insulating resin;
a rotor mounted around a shaft in a manner to face the stator;
first and second bearings supporting the shaft rotatably, the first and second bearings being spaced apart from each other along the shaft and located, respectively, on an output shaft side and a counter output shaft side of the motor, wherein the first bearing includes an electrically insulating material, not included in the second bearing, that makes an electrical resistance through the first bearing higher than an electrical resistance through the second bearing;

a bracket provided on one of the output shaft and counter output shaft sides and fixing one of the first and second bearings; and a drive circuit that supplies an electric current to the winding and drives the rotor.

2. The motor of claim 1, wherein each of the first and second bearings includes an outer ring, an inner ring and bearing balls sandwiched between the outer and inner rings, and the first bearing uses the electrically insulating material for at least one of the outer ring, the inner ring, and the bearing balls.

3. The motor of claim 2, wherein the electrically insulating material is ceramic material.

4. The motor of claim 1, wherein the bracket is provided on one of the output shaft and counter output shaft sides and fixing one of the first and second bearings, and the other of the first and second bearings is fixed to the insulating resin.

5. The motor of claim 4, further comprising a second bracket provided on the other of the output shaft and counter output shaft sides and fixing the other of the first and second bearings, wherein the bracket and the second bracket differ in size from each other.

6. The motor of claim 5, wherein the bracket and the second bracket are made of metal.

7. An electric apparatus including the motor as defined in any one of claims 1-5.

8. The motor of claim 1, wherein the first bearing is located on the output shaft side, and the second bearing is located on the counter output shaft side.

9. The motor of claim 1, wherein the bracket is provided on the counter output shaft side, and no bracket is provided on the output shaft side.

* * * * *